United States Patent
Sugawara

(10) Patent No.: US 7,423,953 B2
(45) Date of Patent: *Sep. 9, 2008

(54) OPTICAL MODULE AND OPTICAL RECORDING AND/OR REPRODUCING APPARATUS

(75) Inventor: Satoru Sugawara, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 24 days.

This patent is subject to a terminal disclaimer.

(21) Appl. No.: 11/437,806

(22) Filed: May 22, 2006

(65) Prior Publication Data

US 2007/0177488 A1    Aug. 2, 2007

Related U.S. Application Data

(63) Continuation of application No. 10/101,748, filed on Mar. 21, 2002, now Pat. No. 7,092,345.

(30) Foreign Application Priority Data

| Mar. 22, 2001 | (JP) | .............................. 2001-083606 |
| Jun. 6, 2001 | (JP) | .............................. 2001-170357 |
| Jul. 6, 2001 | (JP) | .............................. 2001-206358 |
| Sep. 17, 2001 | (JP) | .............................. 2001-282328 |
| Feb. 6, 2002 | (JP) | .............................. 2002-030147 |

(51) Int. Cl.
*G11B 7/085* (2006.01)
(52) U.S. Cl. ................................. 369/112.28; 359/719
(58) Field of Classification Search ............ 369/112.28; 359/719

See application file for complete search history.

(56) References Cited

U.S. PATENT DOCUMENTS

| 4,514,046 | A | | 4/1985 | Carlsen et al. |
| 5,420,651 | A | | 5/1995 | Kamppeter |
| 5,917,660 | A | | 6/1999 | Ohtaki |
| 5,936,929 | A | | 8/1999 | Jiang et al. |
| 5,995,303 | A | | 11/1999 | Honguh et al. |
| 6,347,103 | B1 | | 2/2002 | Song et al. |
| 6,459,672 | B1 | | 10/2002 | Asoma |
| 6,496,469 | B1 | | 12/2002 | Uchizaki |
| 6,587,481 | B1 | | 7/2003 | Seong et al. |
| 6,633,514 | B1 | * | 10/2003 | Awano et al. ............. 369/13.28 |
| 7,092,345 | B2 | * | 8/2006 | Sugawara ............... 369/112.28 |

FOREIGN PATENT DOCUMENTS

JP        11-39684        2/1999

\* cited by examiner

*Primary Examiner*—Gautam R Patel
(74) *Attorney, Agent, or Firm*—Dickstein Shapiro LLP

(57) ABSTRACT

An optical module has a first light source which emits a first light beam from a first light emission point in a predetermined direction, a second light source which emits a second light beam from a second light emission point in the predetermined direction, and an optical element. The optical element includes a plurality of reflection surfaces for reflecting the first and second light beams, and finally outputting the first and second light beams in the predetermined direction with a separation between the first and second light beams smaller than a distance between the first and second light emission points.

15 Claims, 13 Drawing Sheets

OPTICAL MODULE AND OPTICAL RECORDING AND/OR REPRODUCING APPARATUS

The present application is a continuation of and claims the benefit of U.S. application Ser. No. 10/101,748, filed Mar. 3, 2002, now U.S. Pat. No. 7,092,345 which claims the benefit of Japanese Patent Applications No. 2001-083606 filed Mar. 22, 2001, No. 2001-170357 filed Jun. 6, 2001, No. 2001-206358 filed Jul. 6, 2001, No. 2001-282328 filed Sep. 17, 2001, and No. 2002-030147 filed Feb. 6, 2002, in the Japanese Patent Office, the disclosures of which are hereby incorporated by reference in their entirety.

BACKGROUND OF THE INVENTION

1. Field of the Invention

The present invention generally relates to optical modules and optical recording and/or reproducing apparatuses, and more particularly to an optical module which is usable as a light source for generating light beams, and an optical recording and/or reproducing apparatus which records information on and/or reproduces information from a recording medium using the light beams generated from such an optical module.

An optical module of an optical pickup generates a light beam from a semiconductor laser. The light beam is used to record information on and/or reproduce information from optical recording media which include optical disks such as a compact disk (CD) and high-density optical disks such as a digital versatile disk (DVD).

2. Description of the Related Art

Recently, various kinds of optical recording media, including optical disks and high-density optical disks, have been proposed. The optical disks include the CD, CD-R and CD-RW. On the other hand, the high-density optical disks include the DVD and S-DVD. Ideally, it is desirable for a single optical recording and/or reproducing apparatus to be able to recording information on and/or reproduce information from a plurality of kinds of optical disks.

However, an optical pickup which is used for the recording and/or reproduction of information using the optical disk such as the CD, CD-R and CD-RW generates a light beam having a wavelength of 780 nm. A beam spot of this light beam cannot be converged to the size of a pit formed on the high-density optical disk such as the DVD and S-DVD.

On the other hand, an optical pickup which is used for the recording and/or reproduction of information using the high-density optical disk such as the DVD and S-DVD generates a light beam having a wavelength of 650 nm. But a pigment used in the optical disk such as the CD-R cannot reflect this light beam and thus light beam will be transmitted through the optical disk such as the CD-R, thereby making it impossible to reproduce the information from the optical disk such as the CD-R.

Therefore, in order to record information on and/or reproduce information from the optical disk such as the CD-R and the high-density optical disk such as the DVD using a single optical recording and/or reproducing apparatus, it is necessary to provide two semiconductor lasers in the light source part of the optical pickup to respectively generate the light beams having the wavelengths of 780 nm and 650 nm.

But in order to use a common optical system for the two light beams which have the wavelengths of 780 nm and 650 nm and are generated from the two semiconductor lasers, it is necessary to set the two light emission points close together as much as possible. Accordingly, a semiconductor laser unit has been proposed, in which a semiconductor laser chip for generating the light beam having the wavelength of 650 nm and a semiconductor laser chip for generating the light beam having the wavelength of 780 nm are arranged horizontally on a single package. However, according to this proposed semiconductor laser unit, the location of the light emission points are affected by the width of each semiconductor laser chip and the width of a sub-mounting member, and an interval of the light emission points of the two semiconductor laser chips becomes approximately 300 μm to 400 μm and large. As a result, it becomes extremely difficult to design the optical system of the optical pickup.

Hence, a method of artificially reducing the interval between the two light emission points using reflection surfaces has been proposed in a Japanese Laid-Open Patent Application No. 11-39684, for example. FIG. 1 is a diagram showing an optical module employing this proposed method, and corresponds to FIG. 2 of the Japanese Laid-Open Patent Application No. 11-39684. In FIG. 1, a part surrounded by a dotted line is shown on an enlarged scale on the right portion of this figure. A detailed description of FIG. 1 will be omitted in this specification, because it is described in the Japanese Laid-Open Patent Application No. 11-39684.

As shown in FIG. 1, a sub-mounting member 32A has a triangular cross section with reflection surfaces 32B and 32C. A laser beam B1 output from a semiconductor laser 34 is reflected by the reflection surface 32B, and a laser beam B2 output from a semiconductor laser 36 is reflected by the reflection surface 32C. Because the laser beams B1 and B2 are reflected and bent by the reflection surfaces 32B and 32C, it is possible to artificially reduce the interval between the two light emission points. In FIG. 1, a reference numeral 30 denotes a support plate, a reference numeral 32 denotes a support body, and a reference numeral 38 denotes a cap.

In order to realize the method proposed in the Japanese Laid-Open Patent Application No. 11-39684, it is necessary to provide the sub-mounting member 32A having the triangular cross section. However, it is difficult to accurately form the sloping surfaces of the sub-mounting member 32A having the triangular cross section, particularly when the inclination angle of the sloping surfaces is 45 degrees. Because the sloping surfaces determine the reflection surfaces 32B and 32C, inaccurate sloping surfaces cause inaccurate reflections at the reflection surfaces 32B and 32C.

Although several techniques have been proposed to make a member having a triangular cross section with sloping surfaces having an inclination of 45 degrees, none are actually capable of stably mass-producing the member with a high accuracy. Alternatively, it is conceivable to use microprisms to realize a member having the triangular cross section, but it would be extremely difficult to accurately mount the microprisms. Furthermore, since the use of the microprisms will make the member expensive, the use of such a member in the optical pickup will make the optical pickup too expensive from the practical point of view.

Accordingly, the proposed method of artificially reducing the interval between the two light emission points using the reflection surfaces require parts which are both expensive and unsuited for mass-production.

SUMMARY OF THE INVENTION

Accordingly, it is a general object of the present invention to provide a novel and useful optical module and optical recording and/or reproducing apparatus, in which the problems described above are eliminated.

Another and more specific object of the present invention is to provide an optical module and an optical recording and/or reproducing apparatus, which can artificially reduce an interval between two light emission points using a structure which is both inexpensive and suited for mass-production.

Still another object of the present invention is to provide an optical module comprising a first light source which emits a first light beam from a first light emission point in a predetermined direction, a second light source which emits a second light beam from a second light emission point in the predetermined direction, and an optical element having a plurality of reflection surfaces for reflecting the first and second light beams, and finally outputting the first and second light beams in the predetermined direction with a separation between the first and second light beams smaller than a distance between the firsthand second light emission points. According to the optical module of the present invention, it is possible to artificially reduce an interval between the two light emission points using a structure which is both inexpensive and suited for mass-production.

A further object of the present invention is to provide an optical recording and/or reproducing apparatus for recording information on and/or reproducing information from a recording medium using a light beam, comprising an optical pickup which emits one of two light beams having mutually different wavelengths on the recording medium depending on a type of the recording medium, and means for processing the information to be recorded on the recording medium prior to supplying the information to the optical pickup, and processing the information reproduced from the recording medium and obtained from the optical pickup, where said optical pickup has an optical module comprising a first light source which emits a first light beam from a first light emission point in a predetermined direction, a second light source which emits a second light beam from a second light emission point in the predetermined direction, and an optical element having a plurality of reflection surfaces for reflecting the first and second light beams, and finally outputting the first and second light beams in the predetermined direction with a separation between the first and second light beams smaller than a distance between the first and second light emission points. According to the optical information recording and/or reproducing apparatus of the present invention, it is possible to artificially reduce an interval between the two light emission points using a structure which is both inexpensive and suited for mass-production.

Other objects and further features of the present invention will be apparent from the following detailed description when read in conjunction with the accompanying drawings.

DESCRIPTION OF THE PREFERRED EMBODIMENTS

A description will be given of embodiments of an optical module according to the present invention and an optical recording and/or reproducing apparatus according to the present invention, by referring to FIG. 2 and the subsequent drawings.

Figure 1:
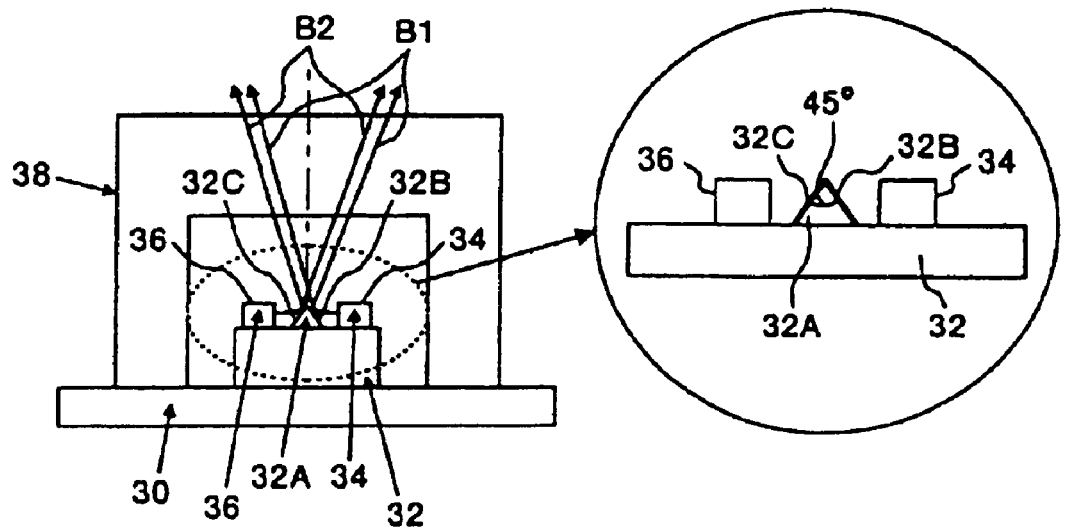
FIG. 1 is a diagram showing an optical module employing a method proposed in a Japanese Laid-Open Patent Application No. 11-39684.

When employing a method of artificially reducing an interval between two light emission points by using reflection surfaces, a most important factor is to align optical axes of two light beams after the reflection. In the prior art FIG. 1 described above, the reflection surfaces 32B and 32C having the 45-degree inclination angle is required in order to align the optical axes of the two light beams emitted from the two confronting semiconductor lasers 34 and 36 after being reflected by the reflection surfaces 32B and 32C. Since the use of a single reflection surface will change the direction of the optical axis of the light beam after the reflection, it was only possible to use reflection surfaces having a specific inclination angle, such as the reflection surface 32B or 32C having the 45-degree inclination angle as in the case of the prior art FIG. 1.

But the present inventor has found that the above described limitations can be eliminated by using two confronting reflection surfaces which are mutually parallel. In other words, the optical axis of the light beam which is incident to the two parallel confronting reflection surfaces, after being reflected two times, becomes perfectly parallel to the optical axis of the incident light beam before being reflected. By utilizing this operating principle of the present invention, it is possible to use two parallel confronting reflection surfaces having an arbitrary inclination angle, and as long as the optical axes of the two incident light beams to the two parallel confronting reflection surfaces before being reflected are mutually parallel, it is possible to make the two light beams after being reflected two times by the two parallel confronting reflection surfaces to become mutually parallel.

Figure 2:
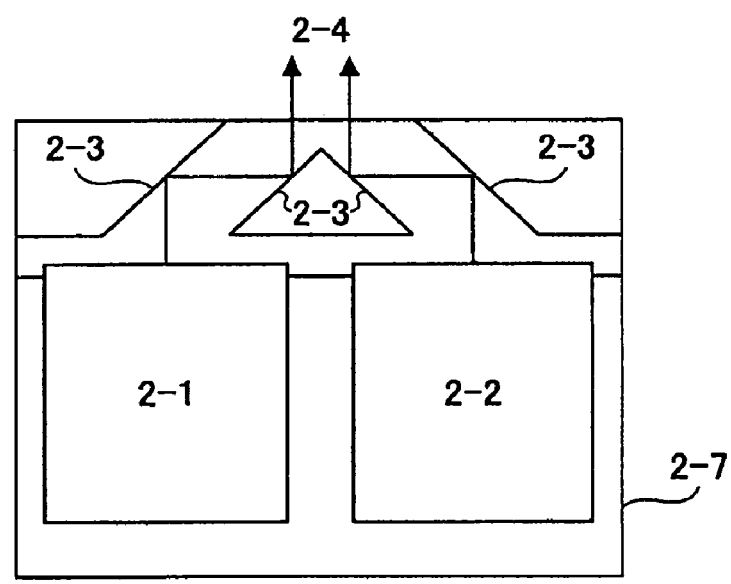
FIG. 2 is a plan view showing a first embodiment of an optical module according to the present invention.

FIG. 2 is a plan view showing a first embodiment of the optical module according to the present invention. The optical module shown in FIG. 2 includes a semiconductor laser (or laser diode) 2-1 which emits a laser beam having a wavelength of 650 nm, a semiconductor laser 2-2 which emits a laser beam having a wavelength of 780 nm, and a sub-mounting member 2-7 on which the semiconductor lasers 2-1 and 2-2 are provided. Reflection surfaces 2-3 are formed on the sub-mounting member 2-7. Optical axes of the laser beams output from the optical module are denoted by a reference numeral 2-4.

Because the semiconductor lasers 2-1 and 2-2 are arranged parallel to each other on the sub-mounting member 2-7, the optical axes of the laser beams emitted from the semiconductor lasers 2-1 and 2-2 are mutually parallel before reaching the corresponding first reflection surfaces 2-3. The optical axis of the laser beam emitted from the semiconductor laser 2-1 and reflected two times, that is, reflected by the first reflection surface 2-3 and the second reflection surface 2-3, is parallel to the optical axis of this laser beam before reaching the first reflection surface 2-3. Similarly, the optical axis of the laser beam emitted from the semiconductor laser 2-2 and reflected two times, that is, reflected by the first reflection surface 2-3 and the second reflection surface 2-3, is parallel to the optical axis of this laser beam before reaching the first reflection surface 2-3. Therefore, the optical axes 2-4 of the laser beams which are respectively reflected two times by the reflection surfaces 2-3 and output from the optical module, are mutually parallel. The reflection surface 2-3 may have an arbitrary inclination angle other than an angle perpendicular to or parallel to the optical axis of the laser beams emitted from the semiconductor lasers 2-1 and 2-2. In addition, even if a relative angle between each of the semiconductor lasers 2-1 and 2-2 and each of the reflection surfaces 2-3 includes a slight error, this error will not affect the direction of the optical axes 2-4 of the laser beams after being reflected by the reflection surfaces 2-3. For this reason, a relatively simple and inexpensive mounting or assembling technique which does not require an extremely high accuracy and is suited for mass-production may be used for the mounting or assembling of the optical module.

Therefore, according to this embodiment, it is possible to artificially vary an interval between two light emission points of two semiconductor lasers with ease, and realize an inexpensive optical module having a reduced interval between the two light emission points.

The laser beam emitted from the semiconductor laser spreads about a center of the optical axis, and an area required of the reflection surface becomes larger as a distance from the light emission point to the reflection surface becomes larger. The interval between the light emission points after the laser beams are reflected cannot be reduced to become smaller than the size of the reflection surface. For this reason, in order to reduce the interval between the two light emission points, it is necessary to reduce the distance between each light emission point and the corresponding reflection surface.

In order to further reduce the distance between each light emission point and each of the corresponding reflection surfaces in the structure shown in FIG. 2, the laser beam emitted from the semiconductor laser 2-1 is first reflected by the first reflection surface 2-3 towards the other semiconductor laser 2-2 and is further reflected by the second reflection surface 2-3 to propagate along the optical axis 2-4. Similarly, the laser beam emitted from the semiconductor laser 2-2 is first reflected by the first reflection surface 2-3 towards the other semiconductor laser 2-1 and is further reflected by the second reflection surface 2-3 to propagate along the optical axis 2-4. By taking these measures, it is possible to further reduce the interval between the two light emission points of the optical module.

The distance between each light emission point and each of the corresponding reflection surfaces in the structure shown in FIG. 2 can be minimized when the arrangement of the semiconductor laser 2-1 and the corresponding first and second reflection surfaces 2-3 is symmetrical, with respect to the right and left about an imaginary center line passing between the semiconductor lasers 2-1 and 2-2 and extending in the direction in which the laser beams are output from the optical module in FIG. 2, to the arrangement of the semiconductor laser 2-2 and the corresponding first and second reflection surfaces 2-3. In this case, it is possible to realize an optical module in which the interval between the two light emission points is extremely small.

Figure 3:
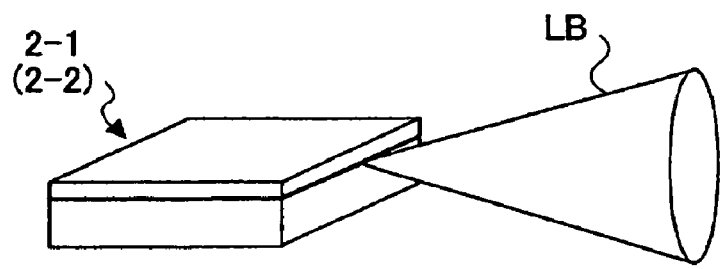
FIG. 3 is a diagram for explaining an angle of radiation of a laser beam emitted from a semiconductor laser.

The laser beam emitted from the semiconductor laser has an angle of radiation which is dependent on the optical structure of a light emission part. The angle of radiation of the laser beam emitted from the semiconductor laser greatly differs between a direction parallel to and a direction perpendicular to a mounting surface of the semiconductor laser (hereinafter simply referred to as a laser mounting surface). In the semiconductor laser which has the general index waveguide structure and is used in optical disk drives, the angle of radiation of the emitted laser beam is flat and approximately 10 degrees in the direction parallel to the laser mounting surface and is approximately 25 degrees in the direction perpendicular to the laser mounting surface. Hence, the laser beam has an oval cross sectional shape which is elongated in the direction perpendicular to the laser mounting surface, as shown in FIG. 3. FIG. 3 is a diagram for explaining the angle of radiation of the laser beam emitted from the semiconductor laser 2-1 or 2-3.

Figure 4A:
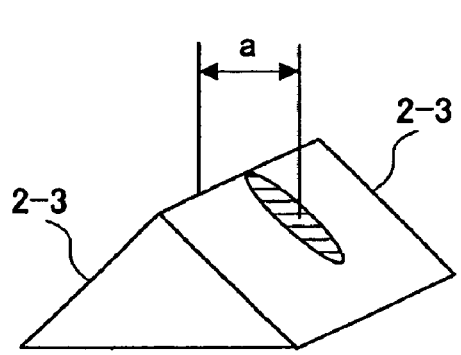
FIGS. 4A and 4B are diagrams for explaining an interval between two light emission points.
Figure 4B:
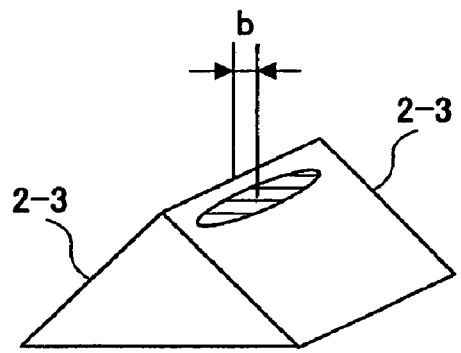

Particularly in the case of the blue semiconductor laser which is recently being developed, structure optimization for use in the optical pickup has not made considerable progress. In the case of the blue semiconductor laser, the angle of radiation becomes extremely flat such that the angle is approximately 5 degrees in the direction parallel to the laser mounting surface and is approximately 30 degrees in the direction perpendicular to the laser mounting surface. In a case where the distance from the light emission point of the semiconductor laser and the reflection surface is constant, an interval "b" between the two light emission points in an arrangement shown in FIG. 4B where an angle formed between the laser mounting surface and the reflection surface is approximately 90 degrees is smaller than an interval "a" between the two light emission points in an arrangement shown in FIG. 4A. FIGS. 4A and 4B are diagrams for explaining the interval between two light emission points. In FIGS. 4A and 4B, a laser beam spot is indicated by the hatching. In FIGS. 4A and 4B, those parts which are the same as those corresponding parts in FIG. 2 are designated by the same reference numerals, and a description thereof will be omitted.

Hence, in this embodiment of the optical module, all of the reflection surfaces 2-3 formed on the sub-mounting member 2-7 shown in FIG. 2 are approximately perpendicular to the laser mounting surface, that is, the surfaces of the semiconductor lasers 2-1 and 2-2. As a result, it is possible to realize an optical module in which the interval between the two light emission points is minimized.

It is desirable that each pair of confronting reflection surfaces 2-3 are mutually parallel and that each pair of confronting reflection surfaces 2-3 can be produced at a low cost. Hence, a material which is most suited for forming the reflection surfaces 2-3 and satisfying these conditions is single crystal silicon (Si). Specific crystal faces of the single crystal Si can be obtained selectively by carrying out an anisotropic etching using an etchant such as KOH. A <111> face of the single crystal Si is extremely suited for use as the reflection surface 2-3 which is highly accurate. The selection ratio of the <111> face of the single crystal Si is 100 or greater when the anisotropic etching is carried out. Hence, it is possible to selectively obtain the crystal face which is usable as the reflection surface 2-3 using the single crystal Si. In addition, it is possible to easily form the pair of confronting reflection surfaces 2-3 are mutually parallel at a low cost, utilizing the processes used to form semiconductor devices. Furthermore, since Si has a high thermal conductivity, Si may also be used for the sub-mounting member 2-7 on which the semiconductor lasers 2-1 and 2-2 are integrally formed.

Accordingly, it is possible to easily form the sub-mounting member 2-7 having the pairs of confronting reflection surfaces 2-3 which are mutually parallel with a high accuracy and at a low cost. When using a non-conductor material for the sub-mounting member 2-7, it is desirable to use a high-resistance Si substrate normally having a conductivity of approximately 1000 Ωcm or greater.

When forming the sub-mounting member 2-7 from Si, it is possible to form all of the reflection surfaces 2-3 in one anisotropic etching by making all of the reflection surfaces 2-3 from the <111> face of Si. In this case, it is possible to easily form at a low cost the sub-mounting member 2-7 having pairs of the reflection surfaces 2-3 which are mutually parallel with a high accuracy and are approximately perpendicular to the laser mounting surface.

When forming all of the reflection surfaces 2-3 from the <111> face of Si, the laser mounting surface which is approximately perpendicular to all of the reflection surfaces 2-3 can be formed from the <110> face of Si, using the crystallographic properties of Si. In this case, it is possible to form with ease and at a low cost the sub-mounting member 2-7 which has the pairs of confronting reflection surfaces 2-3 which are mutually parallel and are approximately perpendicular to the laser mounting surface.

When the laser mounting surface of the sub-mounting member 2-7 is formed from the <110> face of Si, the <111> faces of Si which appear by carrying out the anisotropic etching include the <111> face which is perpendicular to the <110> face forming the laser mounting surface, and also the <111> face which forms an angle of 35.5 degrees with respect to the <110> face. For this reason, it is important from the point of the design to determine how the <111> faces should be processed. Because the angle of radiation of the semiconductor laser is approximately 25 to 30 degrees in the direction perpendicular to the laser mounting surface, the inclination direction of the <111> face and the light emitting direction of the semiconductor laser should be aligned so that the laser beam emitted from the semiconductor laser will not be kicked. In other words, since the <111> face having an angle of 35.3 degrees to the laser mounting surface is inclined in the normal direction of the <100> face which is perpendicular to the <110> face, the semiconductor laser should be mounted so that the laser beam is emitted therefrom towards the <111> face.

Therefore, it is possible to easily produce at a low cost the sub-mounting member 2-7 having the pairs of confronting reflection surfaces 2-3 which are mutually parallel with a high accuracy and are approximately perpendicular to the laser mounting surface.

As described before in conjunction with the prior art, it is necessary to use two semiconductor lasers, one emitting a laser beam having a wavelength of 780 nm and another emitting a laser beam having a wavelength of 650 nm, in order to record information on and/or reproduce information from the CD-R and the DVD on a single optical recording and/or reproducing apparatus. When this embodiment of the optical module uses the two semiconductor lasers respectively emitting the laser beams having the wavelengths of 780 nm and 650 nm as the semiconductor lasers 2-1 and 2-2 shown in FIG. 2, it is possible to realize a light source which emits light beams having two different wavelengths and in which the interval between the two light emission points is extremely small, by use of two ordinary semiconductor lasers (laser diodes) which are arranged adjacent to each other or, arranged side by side to each other.

Figure 5:
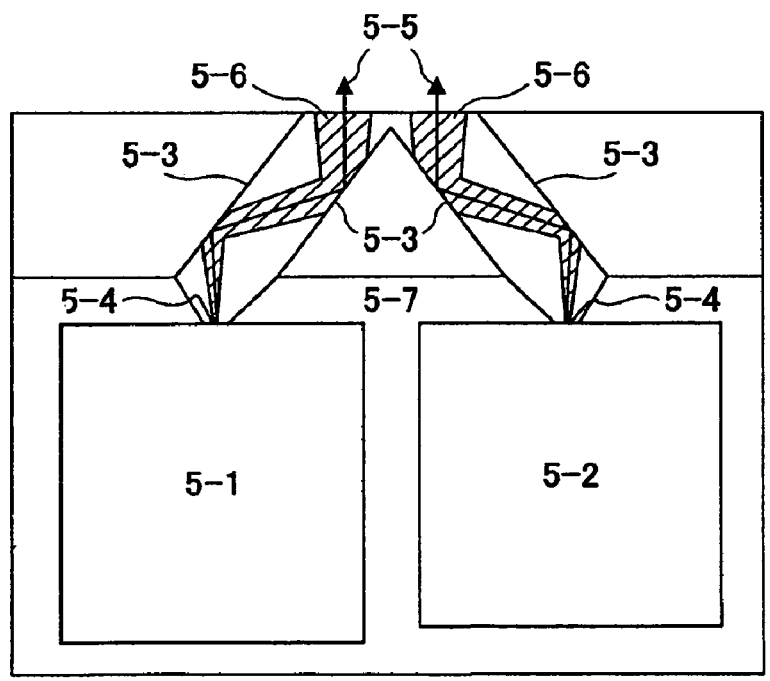
FIG. 5 is a plan view showing a second embodiment of the optical module according to the present invention.

Next, a description will be given of a second embodiment of the optical module according to the present invention, by referring to FIGS. 5 and 6. FIG. 5 is a plan view showing this second embodiment of the optical module, and FIG. 6 is a perspective view showing the optical module shown in FIG. 5.

Figure 6:
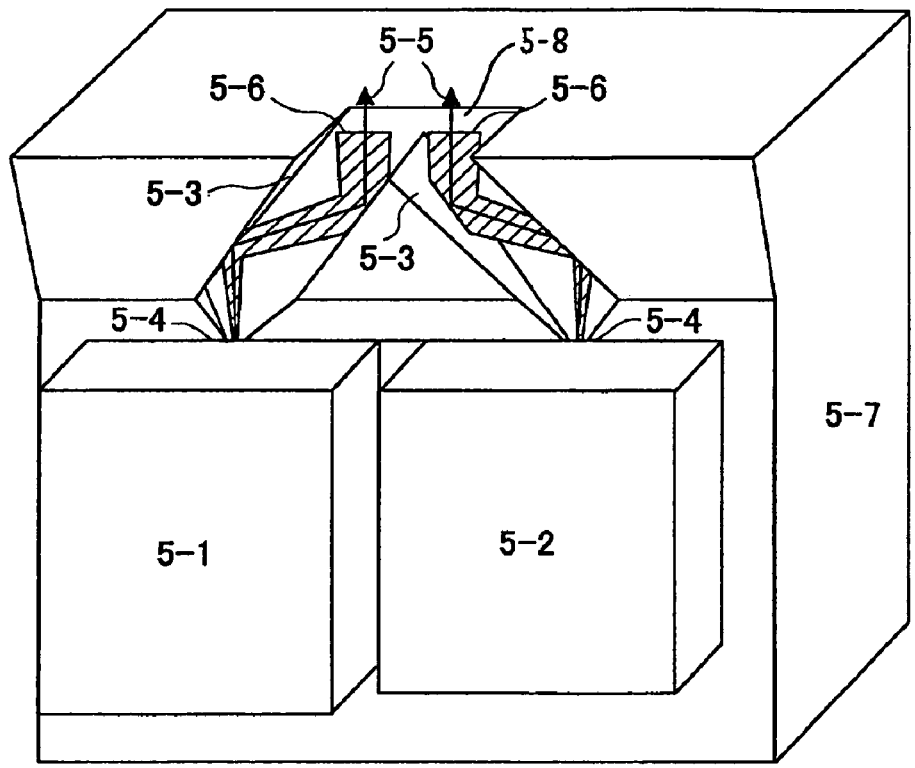
FIG. 6 is a perspective view showing the second embodiment of the optical module.

The optical module shown in FIGS. 5 and 6 includes a semiconductor laser (or laser diode) 5-1 which emits a laser beam having a wavelength of 650 nm, a semiconductor laser 5-2 which emits a laser beam having a wavelength of 780 nm, and a sub-mounting member 5-7 on which the semiconductor lasers 5-1 and 5-2 are provided. Reflection surfaces 5-3 are formed on the sub-mounting member 2-7. An optical axis of each of the laser beams output from the optical module is denoted by a reference numeral 5-5, and a spread of each of the laser beams output from the optical module is denoted by a reference numeral 5-6.

Because the semiconductor lasers 5-1 and 5-2 are arranged parallel to each other on a laser mounting surface of the sub-mounting member 5-7, the optical axes of the laser beams emitted from the semiconductor lasers 5-1 and 5-2 are mutually parallel before reaching the corresponding first reflection surfaces 5-3. The optical axis of the laser beam emitted from the semiconductor laser 5-1 and reflected two times, that is, reflected by the first reflection surface 5-3 and the second reflection surface 5-3, is parallel to the optical axis of this laser beam before reaching the first reflection surface 5-3. Similarly, the optical axis of the laser beam emitted from the semiconductor laser 5-2 and reflected two times, that is, reflected by the first reflection surface 5-3 and the second reflection surface 5-3, is parallel to the optical axis of this laser beam before reaching the first reflection surface 5-3. Therefore, the optical axes 5-5 of the laser beams which are respectively reflected two times by the reflection surfaces 5-3 and output from the optical module via a cutout 5-8 shown in FIG. 6, are mutually parallel. The cutout 5-8 is provided to permit output of the laser beams from the optical module.

The sub-mounting member 5-7 is made of single crystal Si, and the laser mounting surface is formed by the <110> face of the Si. In addition, the reflection surfaces 5-3 are formed symmetrically with respect to the right and left in FIG. 5, by the <111> faces of the Si. Each of the semiconductor lasers 5-1 and 5-2 are mounted on the laser mounting surface in a direction so that the laser beam is emitted in a direction along the normal direction to the <100> face which is perpendicular to the <110> face forming the laser mounting surface. An interval between artificial light emission points of the two laser beams after the reflections is considerably small compared to an interval between light emission points 5-4 of the two semiconductor lasers 5-1 and 5-2, and it is possible to obtain the same effects as in the case of the first embodiment of the optical module described above.

The laser beam emitted from the semiconductor laser spreads about a center of the optical axis, and an area required of the reflection surface becomes larger as a distance from the light emission point to the reflection surface becomes larger. The interval between the light emission points after the laser beams are reflected cannot be reduced to become smaller than the size of the reflection surface. For this reason, in order to reduce the interval between the two light emission points, it is necessary to reduce the distance between each light emission point and the corresponding reflection surface.

The distance between the light emission point and the corresponding reflection surface is dependent on the distance from the light emission point to an end portion of the semiconductor laser. Accordingly, a description will now be given of a third embodiment of the optical module in which the distance from the light emission point to the end portion of the semiconductor laser is reduced, so as to reduce the distance between the light emission point and the corresponding reflection surface.

Figure 7:
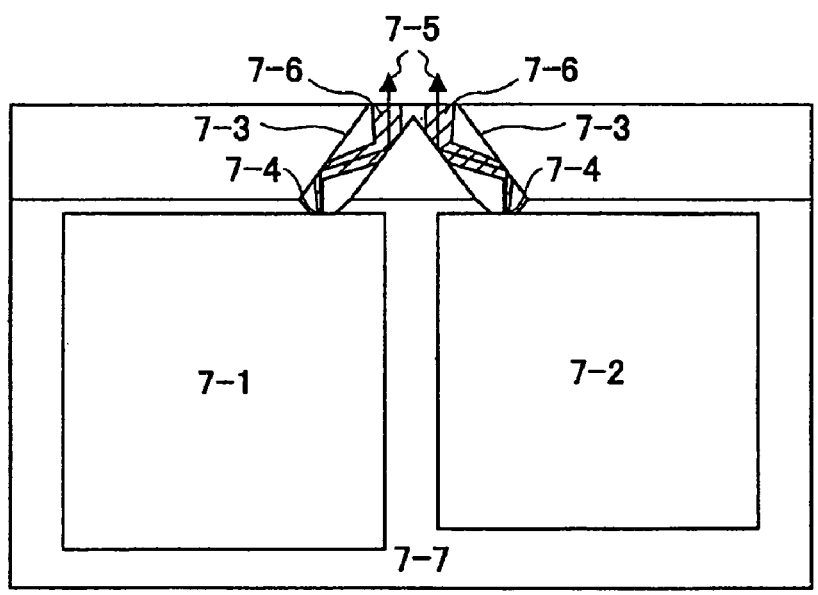
FIG. 7 is a plan view showing a third embodiment of the optical module according to the present invention.
Figure 8:
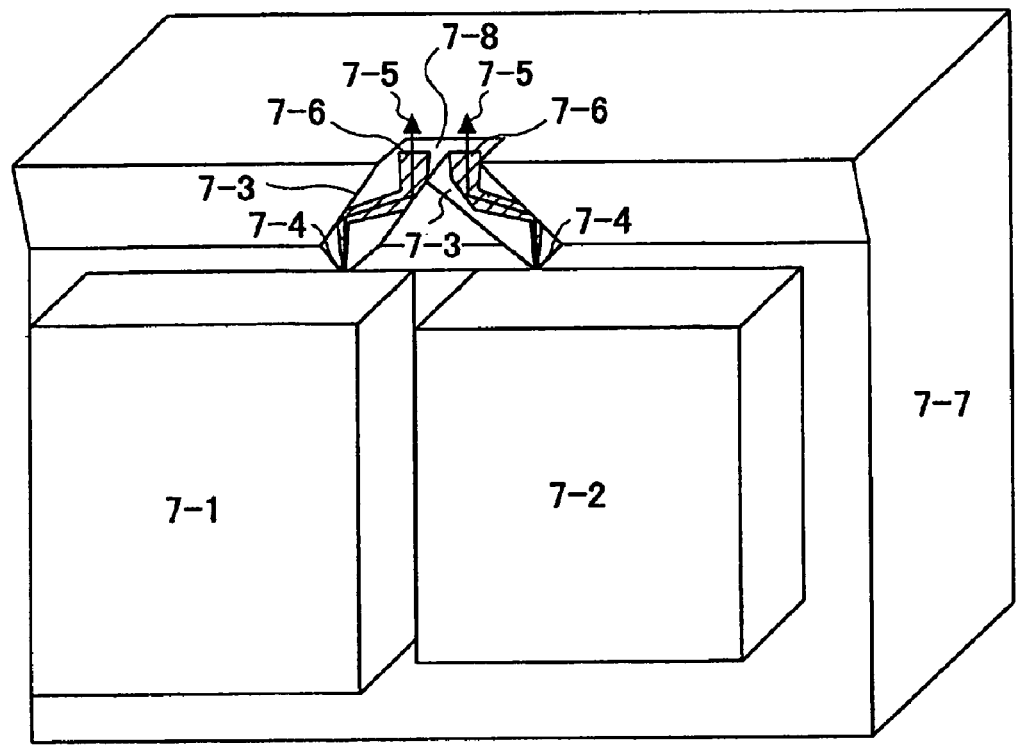
FIG. 8 is a perspective view showing the third embodiment of the optical module.

FIG. 7 is a plan view showing the third embodiment of the optical module according to the present invention, and FIG. 8 is a perspective view showing the optical module shown in FIG. 7.

The optical module shown in FIGS. 7 and 8 includes a semiconductor laser (or laser diode) 7-1 which emits a laser beam having a wavelength of 650 nm, a semiconductor laser 7-2 which emits a laser beam having a wavelength of 780 nm, and a sub-mounting member 7-7 on which the semiconductor lasers 7-1 and 7-2 are provided. Reflection surfaces 7-3 are formed on the sub-mounting member 7-7. An optical axis of each of the laser beams output from the optical module is denoted by a reference numeral 7-5, and a spread of each of the laser beams output from the optical module is denoted by a reference numeral 7-6.

Because the semiconductor lasers 7-1 and 7-2 are arranged parallel to each other on a laser mounting surface of the sub-mounting member 7-7, the optical axes of the laser beams emitted from the semiconductor lasers 7-1 and 7-2 are mutually parallel before reaching the corresponding first reflection surfaces 7-3. The optical axis of the laser beam emitted from the semiconductor laser 7-1 and reflected two times, that is, reflected by the first reflection surface 7-3 and the second reflection surface 7-3, is parallel to the optical axis of this laser beam before reaching the first reflection surface 7-3. Similarly, the optical axis of the laser beam emitted from the semiconductor laser 7-2 and reflected two times, that is, reflected by the first reflection surface 7-3 and the second reflection surface 7-3, is parallel to the optical axis of this laser beam before reaching the first reflection surface 7-3. Therefore, the optical axes 7-5 of the laser beams which are respectively reflected two times by the reflection surfaces 7-3 and output from the optical module via a cutout 7-8 shown in FIG. 8, are mutually parallel. The cutout 7-8 is provided to permit output of the laser beams from the optical module.

The sub-mounting member 7-7 is made of single crystal Si, and the laser mounting surface is formed by the <110> face of the Si. In addition, the reflection surfaces 7-3 are formed symmetrically with respect to the right and left in FIG. 7, by the <111> faces of the Si. Each of the semiconductor lasers 7-1 and 7-2 are mounted on the laser mounting surface in a direction so that the laser beam is emitted in a direction along the normal direction to the <100> face which is perpendicular to the <110> face forming the laser mounting surface. An interval between artificial light emission points of the two laser beams after the reflections is considerably small compared to an interval between light emission points 7-4 of the two semiconductor lasers 7-1 and 7-2, and it is possible to obtain the same effects as in the case of the first embodiment of the optical module described above. Furthermore, since the light emission points 7-4 are respectively arranged at the mutually neighboring end portions of the semiconductor lasers 7-1 and 7-2, the interval between the light emission points 7-4 is small compared to the interval between the light emission points 6-4 of the second embodiment shown in FIGS. 5 and 6. As a result, it is possible to obtain the same effects as in the case of the second embodiment of the optical module described above, and moreover, the interval between artificial light emission points of the two laser beams after the reflections can be made considerably smaller than that of the second embodiment.

Figure 9:
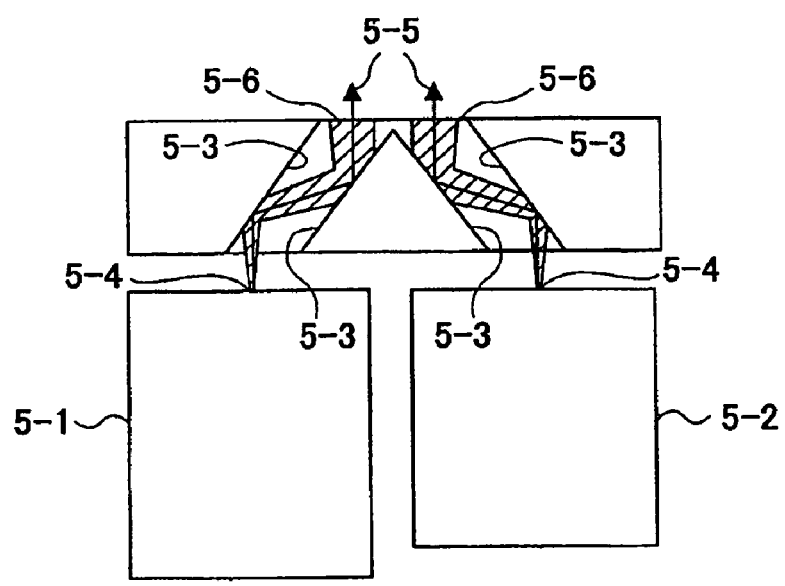
FIG. 9 is a plan view showing a fourth embodiment of the optical module according to the present invention.
Figure 10:
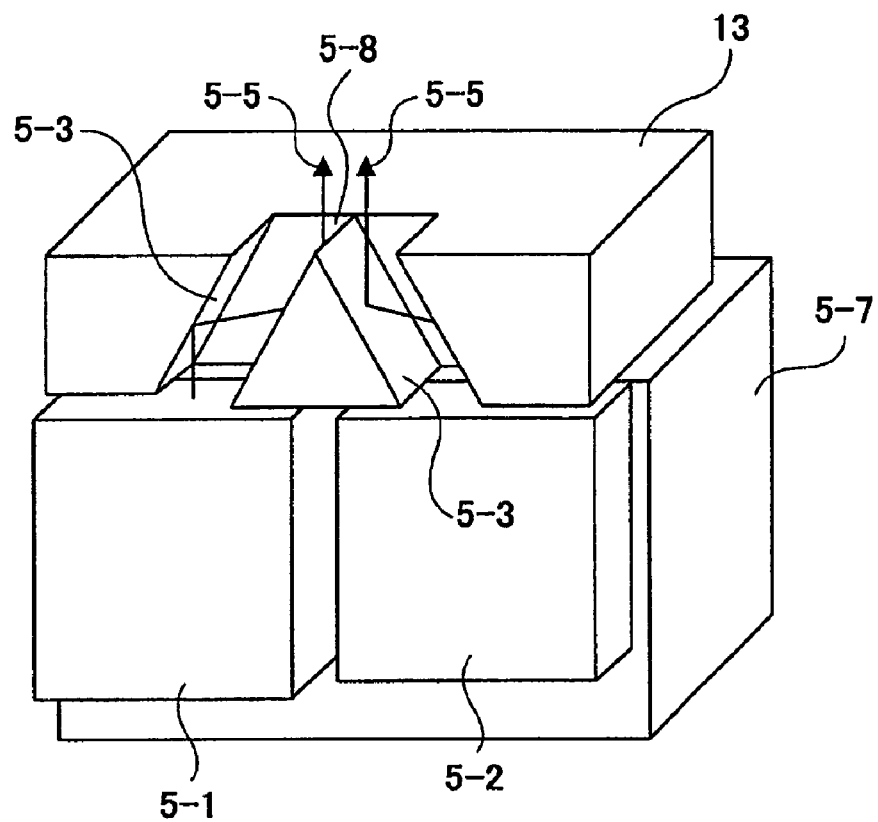
FIG. 10 is a perspective view showing the fourth embodiment of the optical module.

FIG. 9 is a plan view showing the fourth embodiment of the optical module according to the present invention, and FIG. 10 is a perspective view showing the optical module shown in FIG. 9. In FIGS. 9 and 10, those parts which are the same as those corresponding parts in FIGS. 5 and 6 are designated by the same reference numerals, and a description thereof will be omitted.

In FIGS. 9 and 10, an optical element 13 includes a first pair of confronting reflection surfaces 5-3 which are mutually parallel and are non-perpendicular and non-parallel to the optical axis of the laser beam emitted from the semiconductor laser 5-1, and a second pair of confronting reflection surfaces 5-3 which are mutually parallel and are non-perpendicular and non-parallel to the optical axis of the laser beam emitted from the semiconductor laser 5-2. The semiconductor lasers 5-1 and 5-2, and the optical element 13 are mounted on the sub-mounting member 5-7. According to this fourth embodiment, it is possible to obtain the same effects as the second embodiment described above.

Figure 11:
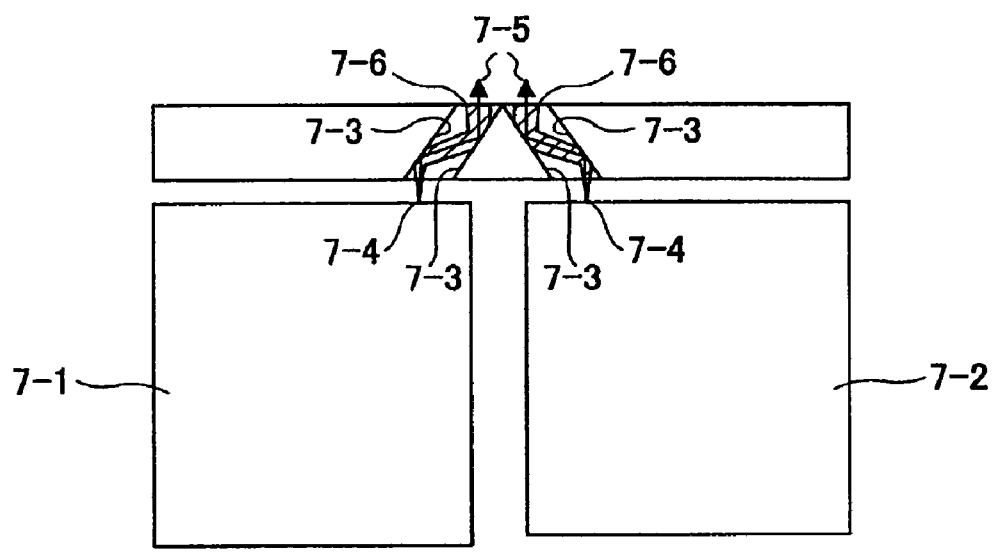
FIG. 11 is a plan view showing a fifth embodiment of the optical module according to the present invention.
Figure 12:
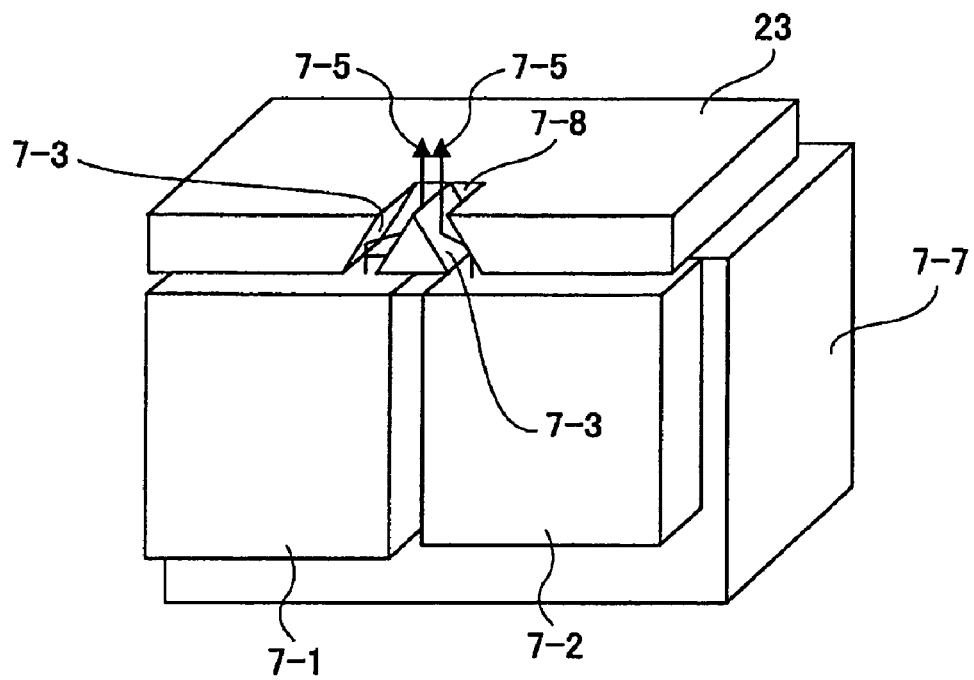
FIG. 12 is a perspective view showing the fifth embodiment of the optical module.

FIG. 11 is a plan view showing the fifth embodiment of the optical module according to the present invention, and FIG. 12 is a perspective view showing the optical module shown in FIG. 11. In FIGS. 11 and 12, those parts which are the same as those corresponding parts in FIGS. 9 and 10 are designated by the same reference numerals, and a description thereof will be omitted.

In FIGS. 11 and 12, an optical element 23 includes a first pair of confronting reflection surfaces 7-3 which are mutually parallel and are non-perpendicular and non-parallel to the optical axis of the laser beam emitted from the semiconductor laser 7-1, and a second pair of confronting reflection surfaces 7-3 which are mutually parallel and are non-perpendicular and non-parallel to the optical axis of the laser beam emitted from the semiconductor laser 7-2. The semiconductor lasers 7-1 and 7-2, and the optical element 23 are mounted on the sub-mounting member 7-7. According to this fifth embodiment, it is possible to obtain the same effects as the third embodiment described above.

Figure 13:
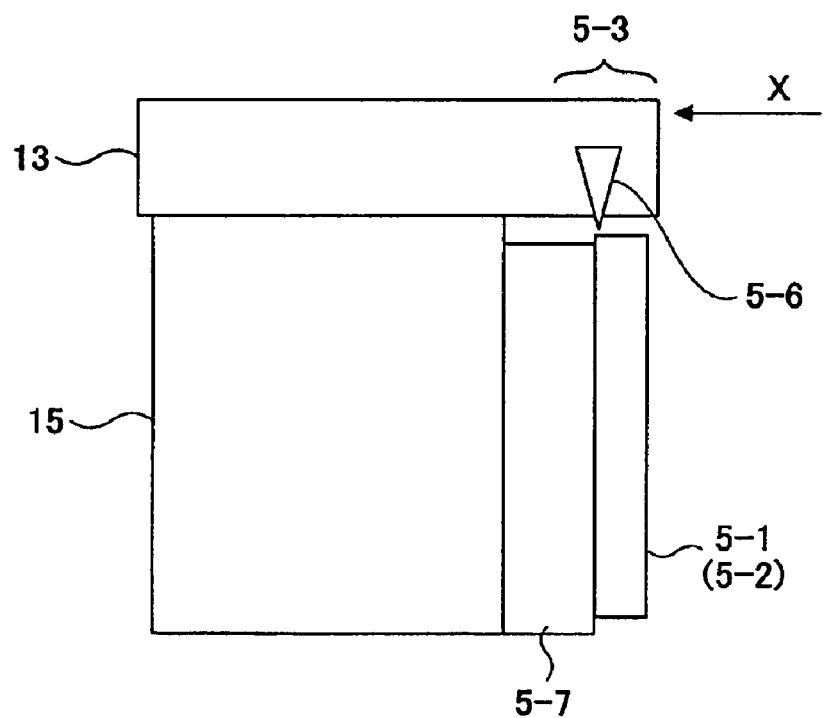
FIG. 13 is a side view showing a sixth embodiment of the optical module according to the present invention.

Next, a description will be given of a sixth embodiment of the optical module according to the present invention, by referring to FIG. 13. FIG. 13 is a side view showing the sixth embodiment of the optical module. In FIG. 13, those parts which are the same as those corresponding parts in FIGS. 9 and 10 are designated by the same reference numerals, and a description thereof will be omitted.

As shown in FIG. 13, this sixth embodiment is provided with a stem 15, so as to facilitate the positioning of the elements forming the optical module. The sub-mounting member 5-7 is mounted on a top surface (right side in FIG. 13) of the stem 15, and the semiconductor lasers 5-1 and 5-2 are mounted on the laser mounting surface (right side in FIG. 13) of the sub-mounting member 5-7. A side surface (top side in FIG. 13) of the stem 15 is approximately perpendicular to the laser mounting surface, and the optical element 13 is mounted on this side surface (top side in FIG. 13) of the stem 15. When considering the ease with which the weight of the optical element 13 may be applied, it is desirable to mount the optical element 13 on the side surface of the stem 15 which is approximately perpendicular to the top surface of the stem 15 on which the sub-mounting member 5-7 is mounted. In FIG. 13, X denotes a direction which is perpendicular to the laser mounting surface.

An arrangement which enables the size of the reflection surfaces 5-3 in a direction perpendicular to the laser mounting surface to be minimized is to arrange the optical axis of each laser beam in a vicinity of a center of the corresponding reflection surface 5-3.

When the <111> face of the single crystal Si is used to form each reflection surface 5-3, this <111> face is perpendicular to the laser mounting surface. In order to realize the reflection surfaces 5-3 at a low cost, it is desirable to use a single crystal Si substrate having a substrate surface formed by the <110> face. In this case, the <111> face which is perpendicular to the <110> substrate surface is obtained in two directions, and further, the <110> substrate surface is parallel to the laser mounting surface.

The two <111> faces, which are perpendicular to the <110> substrate surface, intersect at an angle of 70.52 (180−70.52=109.48) degrees. In order to arrange the <111> faces symmetrically with respect to the right and left in the plan view of the optical module, it is possible to use the <110> face or the <100> face as a mounting surface of the optical element 13 which is mounted on the side surface of the stem 15. The two <111> faces which are perpendicular to the <110> substrate surface intersect at the angle of 109.48 degrees when the <110> face is used as the mounting surface of the optical element 13. On the other hand, the two <111> faces which are perpendicular to the <110> substrate surface intersect at the angle of 70.52 degrees when the <100> face is used as the mounting surface of the optical element 13.

Figure 14:
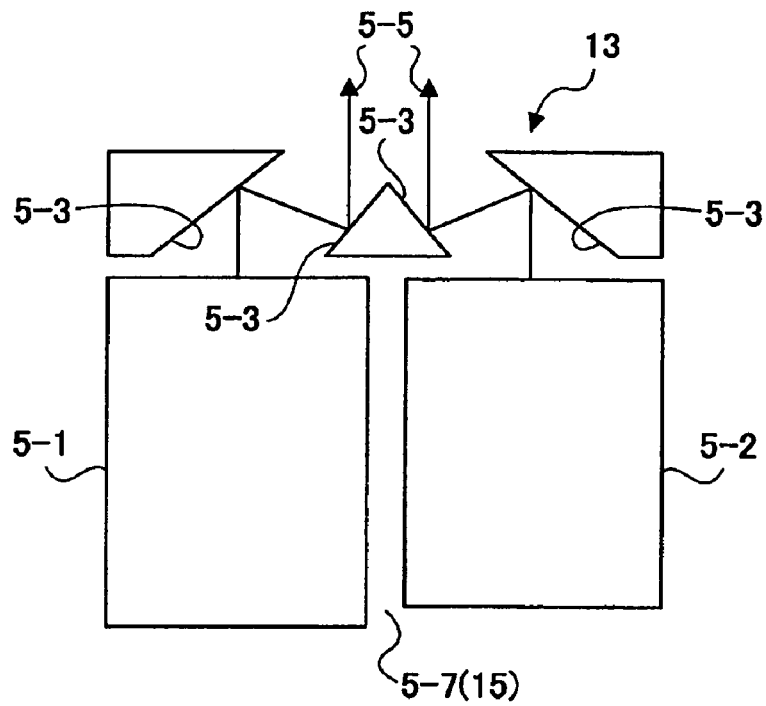
FIG. 14 is a plan view showing a first modification of the sixth embodiment of the optical module.
Figure 15:
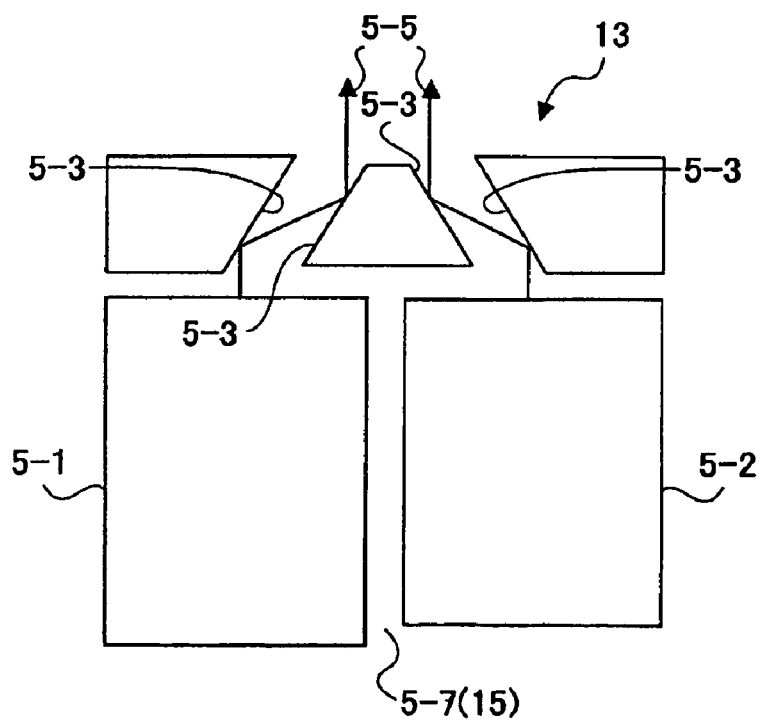
FIG. 15 is a plan view showing a second modification of the sixth embodiment of the optical module.

FIG. 14 is a plan view showing a first modification of the sixth embodiment of the optical module, where the <110> face is used as the mounting surface of the optical element 13 with respect to the stem 15. On the other hand, FIG. 15 is a plan view showing a second modification of the sixth embodiment of the optical module, where the <100> face is used as the mounting surface of the optical element 13 with respect to the stem 15. In FIGS. 14 and 15, those parts which are the same as those corresponding parts in FIGS. 9 and 10 are designated by the same reference numerals, and a description thereof will be omitted.

As may be seen from a comparison of FIGS. 14 and 15, an increase in the optical path at the optical element 13 is smaller for the second modification shown in FIG. 15. It is desirable that the increase in the optical path is as small as possible in an optical system which converges the light beam on a light receiving element using a hologram element such as that used in the optical pickup, because the increase in the optical path may restrict the degree of freedom of design. For this reason, it is more desirable for the mounting surface of the optical element 13 to be formed by the <100> face of the single crystal Si when reducing the length of the optical path.

Figure 16:
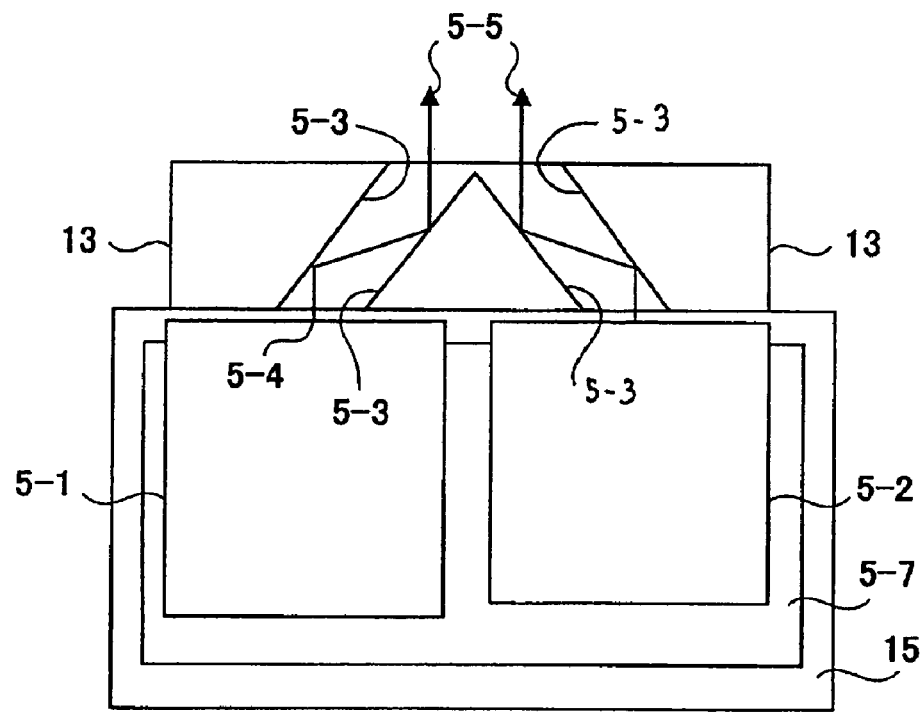
FIG. 16 is a plan view showing a seventh embodiment of the optical module according to the present invention.
Figure 17:
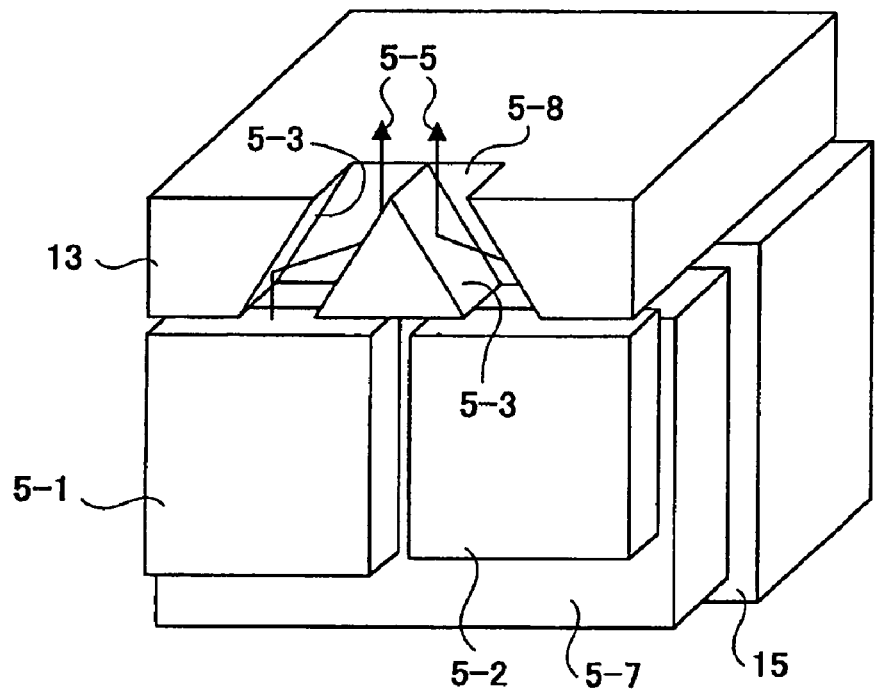
FIG. 17 is a perspective view showing the seventh embodiment of the optical module.

Next, a description will be given of a seventh embodiment of the optical module according to the present invention, by referring to FIGS. 16 and 17. FIG. 16 is a plan view showing the seventh embodiment of the optical module, and FIG. 17 is a perspective view showing the seventh embodiment of the optical module. In FIGS. 16 and 17, those parts which are the same as those corresponding parts in FIGS. 9, 10 and 13 are designated by the same reference numerals, and a description thereof will be omitted.

In FIGS. 16 and 17, the optical element 13 and the sub-mounting member 5-7 are made of a single crystal Si. Each of the reflection surfaces 5-3 of the optical element 13 is formed by the <111> face of the Si, and the laser mounting surface of the sub-mounting member 5-7 is formed by the <100> face of the Si. In addition, the surface of the optical element 13 perpendicular to the laser mounting surface is formed by the <110> face of the Si. According to this seventh embodiment, it is possible to obtain the same effects as the fourth embodiment described above.

Figure 18:
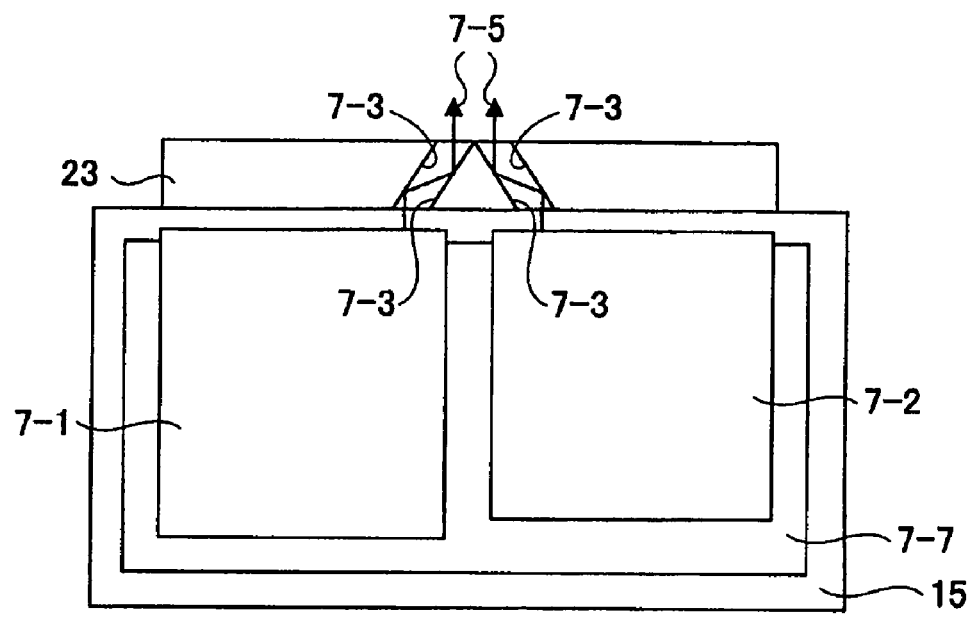
FIG. 18 is a plan view showing an eighth embodiment of the optical module according to the present invention.
Figure 19:
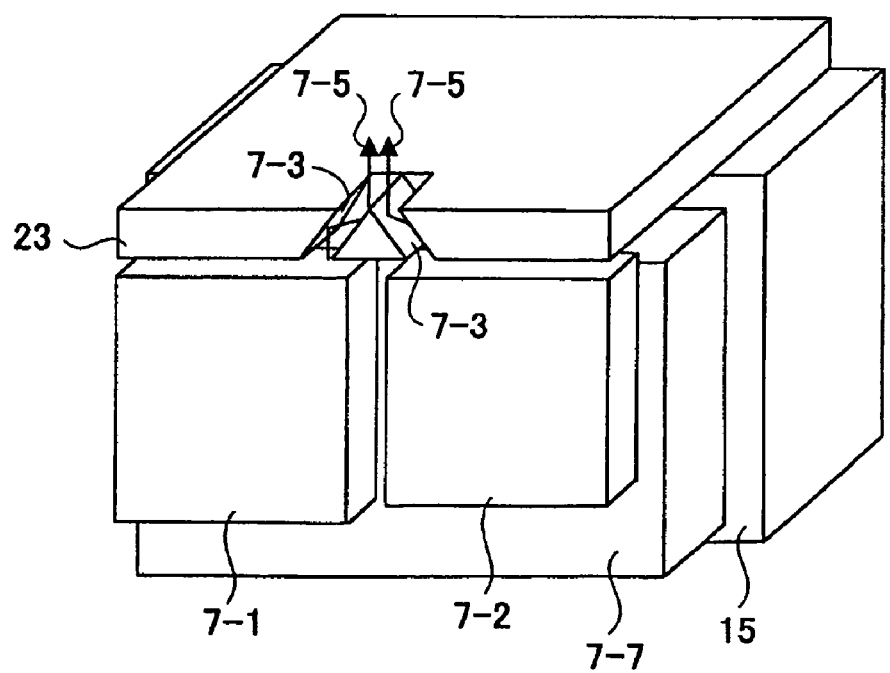
FIG. 19 is a perspective view showing the eighth embodiment of the optical module.

Next, a description will be given of an eighth embodiment of the optical module according to the present invention, by referring to FIGS. 18 and 19. FIG. 18 is a plan view showing the eighth embodiment of the optical module, and FIG. 19 is a perspective view showing the eighth embodiment of the optical module. In FIGS. 18 and 19, those parts which are the same as those corresponding parts in FIGS. 11, 12 and 13 are designated by the same reference numerals, and a description thereof will be omitted.

In FIGS. 18 and 19, the optical element 23 and the sub-mounting member 7-7 are made of a single crystal Si. Each of the reflection surfaces 7-3 of the optical element 23 is formed by the <111> face of the Si, and the laser mounting surface of the sub-mounting member 7-7 is formed by the <100> face of the Si. In addition, the surface of the optical element 23 perpendicular to the laser mounting surface is formed by the <110> face of the Si. According to this eighth embodiment, it is possible to obtain the same effects as the fifth embodiment described above.

In each of the embodiments and modifications described above, the second reflection surfaces meet and form a triangular shape in the plan view of the optical module. But at an apex portion of this triangular shape, on the order of several tens of $\mu$m from the apex, it is difficult to obtain a high processing accuracy and the surface accuracy of the reflection surface may deteriorate at the apex portion. If the laser beam is reflected at the apex portion of the reflection surface having the deteriorated surface accuracy, the laser beam may be deflected in unwanted directions and generate noise. In addition, even if the surface accuracy at the apex portion of the reflection surfaces can be maintained high, the laser beam reflected at the apex portion may still scatter due to diffraction and similarly generate noise.

Figure 20:
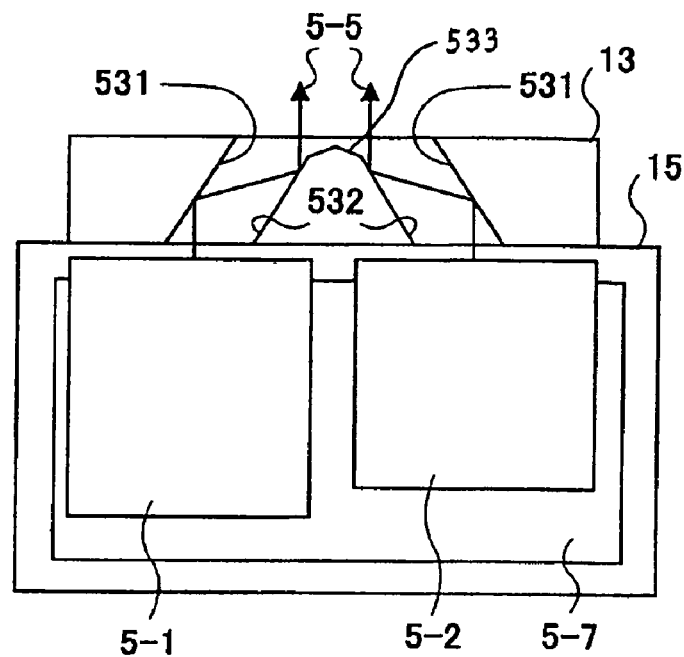
FIG. 20 is a plan view showing a ninth embodiment of the optical module according to the present invention.
Figure 21:
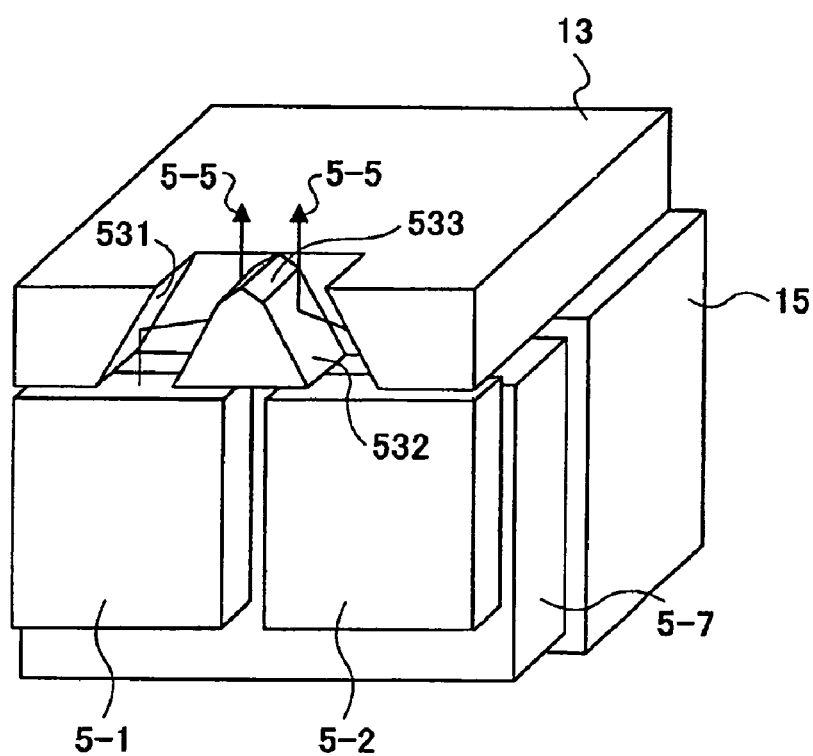
FIG. 21 is a perspective view showing the ninth embodiment of the optical module.
Figure 22:
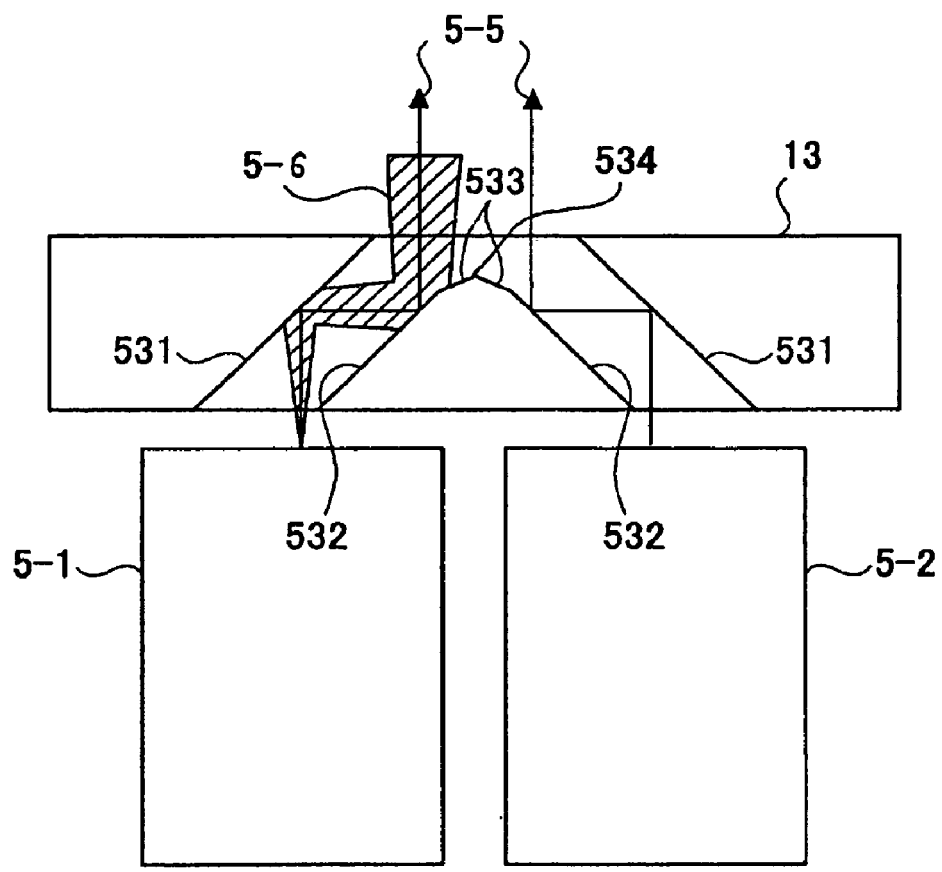
FIG. 22 is a diagram for explaining reflections in the ninth embodiment.
Figure 23:
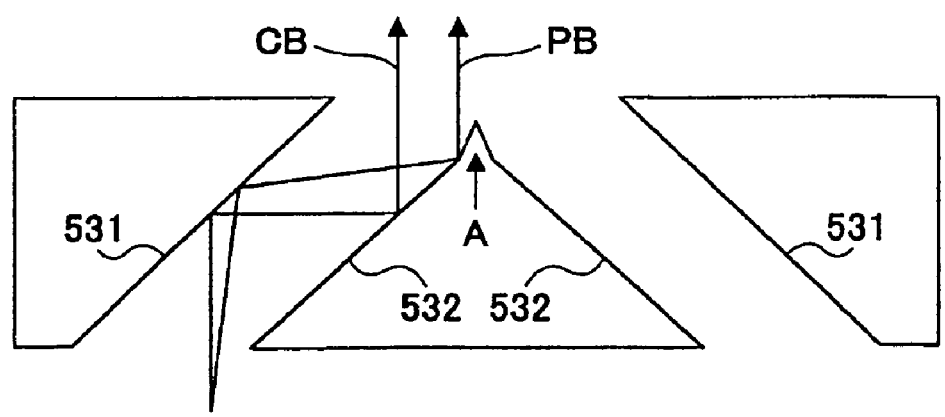
FIG. 23 is a diagram for explaining reflection in a vicinity of an apex portion of the reflection surface.
Figure 24:
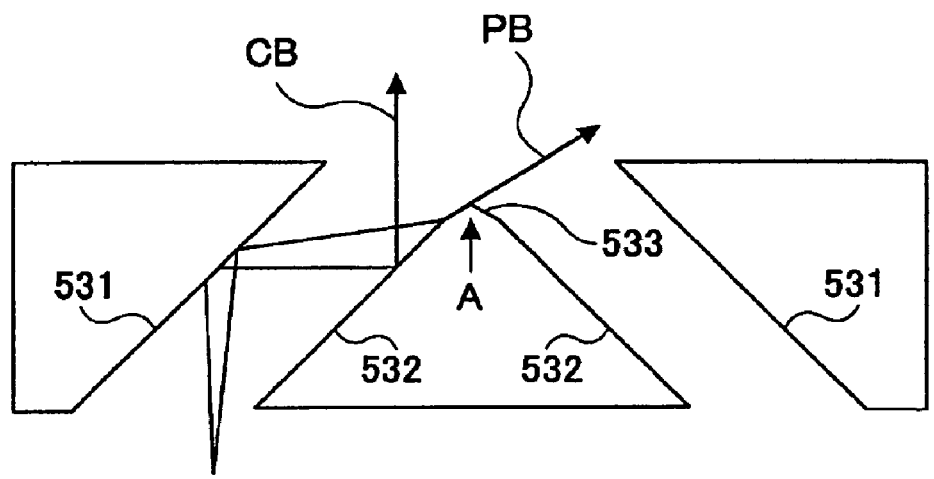
FIG. 24 is a diagram for explaining reflection in the vicinity of the apex portion of the reflection surface.

Accordingly, a description will now be given of a ninth embodiment of the optical module according to the present invention which can positively prevent the generation of such noise, by referring to FIGS. 20 through 24. FIG. 20 is a plan view showing the ninth embodiment of the optical module, and FIG. 21 is a perspective view showing the ninth embodiment of the optical module. FIG. 22 is a diagram for explaining reflections in the ninth embodiment. Further, FIGS. 23 and 24 are diagrams for explaining reflection in a vicinity of an apex portion of the reflection surface. In FIGS. 20 through 24, those parts which are the same as those corresponding parts in FIGS. 5, 6, 16 and 17 are designated by the same reference numerals, and a description thereof will be omitted.

As shown in FIG. 22, the optical element 13 includes a pair of first reflection surfaces 531, a pair of second reflection surfaces 532, and a pair of tapered surfaces 533 forming an apex portion of a triangular shape formed by the second reflection surfaces 532. An inclination angle of each of the pair of tapered surfaces 533 is different from that of the second reflection surfaces 532. The first and second reflection surfaces 531 and 532 provided on the left side in FIG. 22 confront each other and are mutually parallel. Similarly, the first and second reflection surfaces 531 and 532 on the right side in FIG. 22 confront each other and are mutually parallel.

For example, between the first and second reflection surfaces 531 and 532 on the left side in FIG. 22, a normal to the first reflection surface 531 is parallel to a normal to the second reflection surface 532 because the first and second reflection surfaces 531 and 532 are mutually parallel. Accordingly, if the incident angle and the exit angle of the laser beam is defined by intersection angles with respect to the normal, the incident angle of the laser beam to the first reflection surface 531 and the exit angle of the laser beam from the first reflection surface 531 are equal. Similarly, the incident angle of the laser beam to and the exit angle of the laser beam from the second reflection surface 532 are equal. The exit angle of the laser beam from the first reflection surface 531 and the incident angle of the laser beam to the second reflection surface 532 are equal since these angles are alternate angles. For this reason, the incident angle of the laser beam to the first reflection surface 531 and the exit angle of the laser beam from the second reflection surface 532 are also equal. Because the normal to the first reflection surface 531 and the normal to the second reflection surface 532 are mutually parallel, the optical axis of the laser beam emitted from the corresponding semiconductor laser 5-1 is parallel to the optical axis 5-5 of the laser beam output from the optical module.

The tapered surfaces 533 are obtained by removing a portion of the intersecting second reflection surfaces 532 at the apex portion of the triangular shape. As shown in FIG. 22 with respect to the laser beam emitted from the left semiconductor laser 5-1, the spread 5-6 of the laser beam is caused by the peripheral light due to diffraction of light about the optical axis. The tapered surfaces 533 are provided in order to prevent the peripheral light from reaching an unwanted location on a recording surface of a recording medium to generate noise when the optical module is used in the optical pickup of the optical recording and/or reproducing apparatus.

FIG. 23 shows a case where the apex portion of the triangular shape at the intersection of the second reflection surfaces 532 projects due to a limit in the processing accuracy. On the other hand, FIG. 24 shows a case where the apex portion of the triangular shape at the intersection of the second reflection surfaces 532 is tapered by the tapered surfaces 533, as in the case of this ninth embodiment. In FIGS. 23 and 24, CB denotes a center light portion of the laser beam, and PB denotes a peripheral light portion of the laser beam.

As shown in FIG. 23, the projecting apex portion reflects the peripheral light portion PB, and causes the peripheral light to propagate in an unwanted direction together with the center light portion CB of the laser beam. The peripheral light portion PB generates noise when irradiated at an unwanted location of the recording surface of the recording medium. But in the case shown in FIG. 24, the peripheral light portion PB is reflected by the tapered surface 533 in a direction other than the propagating direction of the center light portion CB of the laser beam. For this reason, the arrangement shown in FIG. 24 can positively prevent the noise which would be generated if the peripheral light portion PB were to propagate towards the recording surface of the recording medium together with the center light portion CB of the laser beam. A light blocking means such as a light blocking plate (not shown) may be provided at a position in a path intercepting the reflected peripheral light portion PB from the tapered surface 533, so as to more positively prevent the reflected peripheral light portion PB from reaching an unwanted location such as the unwanted location on the recording surface of the recording medium.

Figure 25:
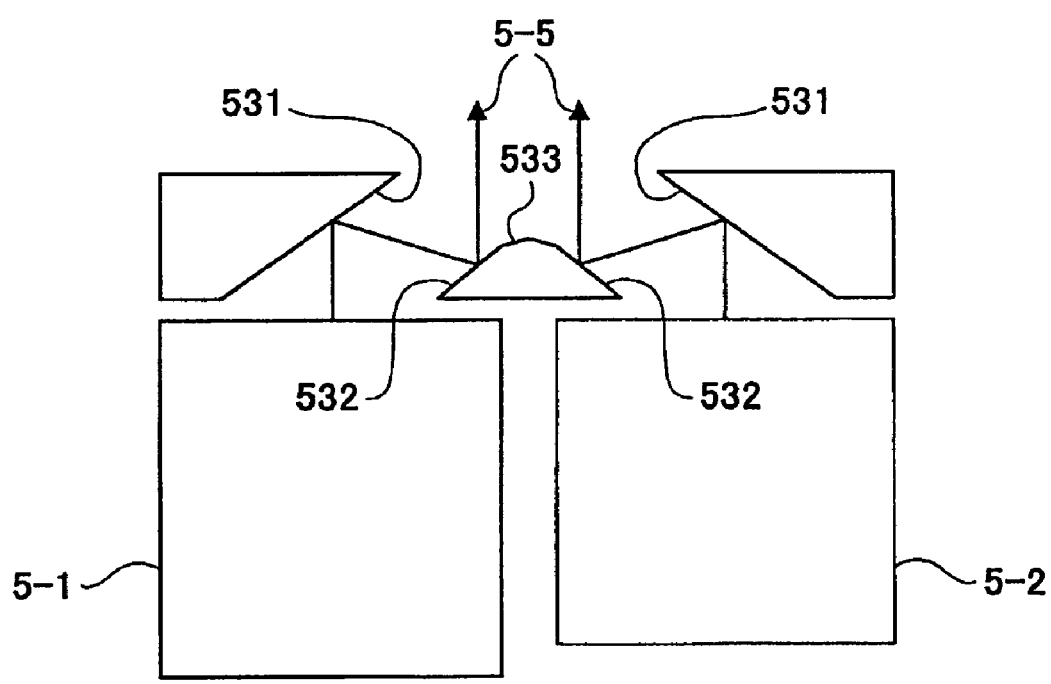
FIG. 25 is a plan view showing a first modification of the ninth embodiment of the optical module.
Figure 26:
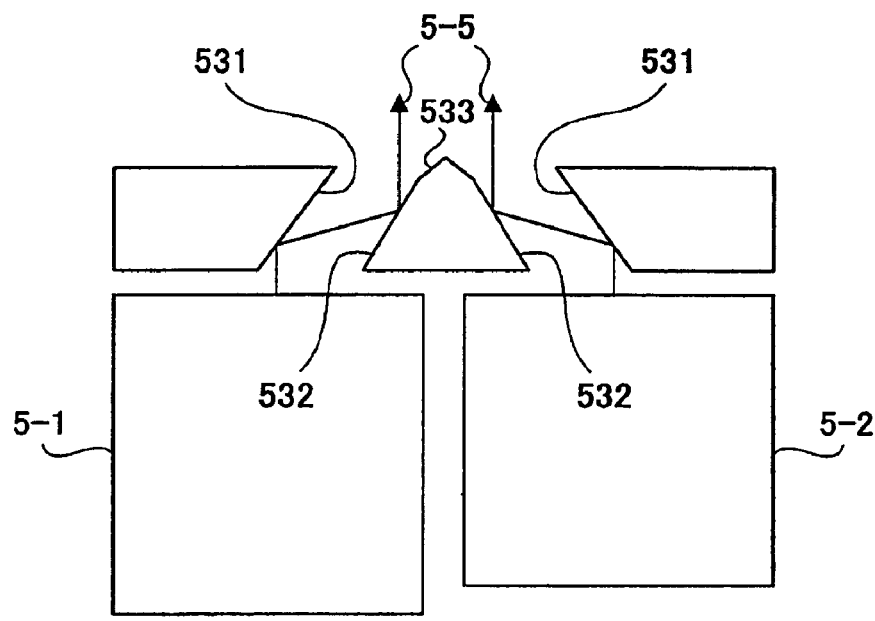
FIG. 26 is a plan view showing a second modification of the ninth embodiment of the optical module.

FIG. 25 is a plan view showing a first modification of the ninth embodiment of the optical module, where the <110> face is used as the mounting surface of the optical element 13 with respect to the stem 15, similarly to the structure shown in FIG. 14. On the other hand, FIG. 26 is a plan view showing a second modification of the ninth embodiment of the optical module, where the <100> face is used as the mounting surface of the optical element 13 with respect to the stem 15, similarly to the structure shown in FIG. 15. In FIGS. 25 and 26, those parts which are the same as those corresponding parts in FIGS. 20, 21 and 22 are designated by the same reference numerals, and a description thereof will be omitted.

As may be seen from a comparison of FIGS. 25 and 26, an increase in the optical path at the optical element 13 is smaller for the second modification shown in FIG. 26. It is desirable that the increase in the optical path is as small as possible in an optical system which converges the light beam on a light receiving element using a hologram element such as that used in the optical pickup, because the increase in the optical path may restrict the degree of freedom of design. For this reason, it is more desirable for the mounting surface of the optical element 13 to be formed by the <100> face of the single crystal Si when reducing the length of the optical path.

Figure 27:
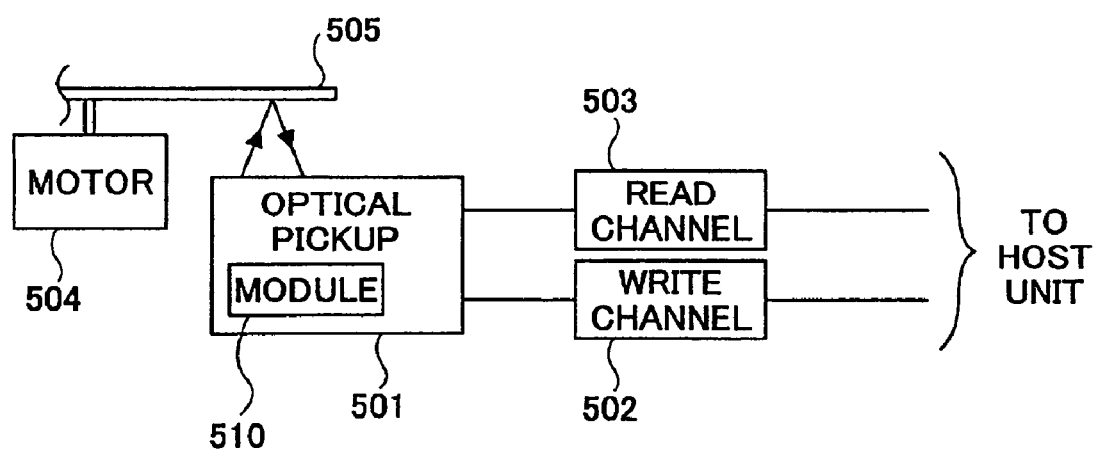
FIG. 27 is a diagram showing an embodiment of an optical recording and/or reproducing apparatus according to the present invention.

FIG. 27 is a diagram showing an embodiment of an optical recording and/or reproducing apparatus according to the present invention. As shown in FIG. 27, the optical recording and/or reproducing apparatus includes an optical pickup 501, a write channel 52, a read channel, and a motor 504. The motor 504 rotates an optical recording medium 505, such as a disk, which is loaded into the optical recording and/or reproducing apparatus, by a known means. This basic structure of the optical recording and/or reproducing apparatus is known, and other known basic structures may be used for the optical recording and/or reproducing apparatus.

This embodiment of the optical recording and/or reproducing apparatus is characterized by an optical module 510 provided within the optical pickup 501. The optical module 510 may have the structure of any of the embodiments and modifications of the optical module described above.

In a write mode of the optical recording and/or reproducing apparatus, a write instruction from a host unit (not shown) such as a personal computer causes a write data from the host unit to be processed in the write channel 502 and supplied to the optical pickup 501. The optical pickup 501 irradiates a laser beam which is emitted from the optical module 501 on the optical recording medium 505, depending on the type of the optical recording medium 505, so as to record the write data on the optical recording medium. For example, if the optical recording medium 505 is a CD-ROM, the laser beam having the wavelength of 780 nm is irradiated on the optical recording medium 505.

On the other hand, in a read mode of the optical recording and/or reproducing apparatus, a read instruction from the host unit causes the optical pickup 501 to irradiate a laser beam which is emitted from the optical module 501 on the optical recording medium 505, depending on the type of the optical recording medium 505, so as to reproduce read data from the optical recording medium. For example, if the optical recording medium 505 is a DVD, the laser beam having the wavelength of 650 nm is irradiated on the optical recording medium 505. The read instruction also causes the read data from the optical pickup 501 to be processed in the read channel 502 and supplied to the host unit.

According to this embodiment of the optical recording and/or reproducing apparatus, it is possible to realize an inexpensive optical recording and/or reproducing apparatus which is compatible with a plurality of types of recording media which require light beams having different wavelengths to be irradiated thereon for the data recording and/or data reproduction.

Any of the embodiments and modifications of the optical module described above may be combined with a hologram element, photodiode chip or the like to form an integrated optical pickup module having an extremely small interval between two light emission points from which two light beams are emitted. Such an integrated optical pickup module can be produced by a relatively simple process at a low cost. The two light beams emitted from the two light emission points may have mutually different wavelengths such as 780 nm and 650 nm or, 650 nm and 410 nm.

In addition, since the reflection surface formed by the Si has a relatively low reflectivity, it is desirable in each of the embodiments and modifications described above to provide a reflection layer on the reflection surface in order to increase the reflectivity. The incident angle of the laser beam with respect to the reflection surface is approximately ±10 degrees when the spread of the laser beam is taken into consideration, for example, and is relatively large. But it is extremely difficult to obtain a high reflectivity with respect to such a large incident angle using a dielectric multi-layer structure.

Gold (Au) has a higher reflectivity with respect to the wavelength of 650 nm to wavelengths of the near infrared region than aluminum (Al), and is extremely suited for use as the reflection layer to be formed on the reflection surface. Since the bonding strength of Au on Si is small, however, it is desirable to employ a multi-layer structure in which the Au layer is formed on an underlayer which is made of titanium (Ti), chromium (Cr) or the like. By employing such a multi-layer structure for the reflection layer on the reflection surface, it is possible to obtain a high reflectivity and a large bonding strength between the reflection layer and the Si underneath. Of course, the reflection layer may be provided on all of the reflection surfaces or only on selected reflection surfaces.

Further, the present invention is not limited to these embodiments, but various variations and modifications may be made without departing from the scope of the present invention.

What is claimed is:

1. An optical module comprising:
   a first light source which emits a first light beam from a first light emission point in a predetermined direction;
   a second light source which emits a second light beam from a second light emission point in the same direction as and parallel to the predetermined direction, the second light emission point being arranged at a first distance from the first light emission point; and
   a plurality of reflection surfaces for reflecting the first and second light beams at least twice to orient the first and second light beams in the same direction as and parallel to the predetermined direction and to separate the first and second light beams by a second distance that is smaller than the first distance,
   wherein the first light source, the second light source, and the plurality of reflection surfaces are integrated in a single module.

2. The optical module as claimed in claim 1, wherein said optical element has a cutout through which the first and second light beams are output from the optical module.

3. The optical module as claimed in claim 1, wherein the first and second light beams are reflected at approximate centers of each of the plurality of reflection surfaces.

4. The optical module as claimed in claim 1, wherein the first and second light beams emitted from the first and second light sources have mutually different wavelengths.

5. The optical module as claimed in claim 4, wherein said first and second light sources are made of semiconductor lasers.

6. The optical module as claimed in claim 1, wherein the first light emission point is provided at a position on the first light source closer to an end of the first light source adjacent to the second light source, and the second light emission point is provided at a position on the second light source closer to an end of the second light source adjacent to the first light source.

7. The optical module as claimed in claim 1, wherein at least some of the plurality of reflection surfaces have a reflection layer with a multi-layer structure provided thereon, said multi-layer structure comprising an Au layer is formed on an underlayer which is in contact with the reflection surface.

8. The optical module as claimed in claim 7, wherein the underlayer is made of a material selected from a group consisting of Ti and Cr.

9. The optical module as claimed in claim 1, further comprising:
   a stem having first and second surfaces which are mutually adjacent;
   a sub-mounting member having a mounting surface on which the first and second light sources are mounted, and an opposite surface provided on an opposite end from the mounting surface,
   said opposite surface of the sub-mounting member being connected to the first surface of the stem,
   said optical element being connected to the second surface of the stem.

10. The optical module as claimed in claim 1, wherein the plurality of reflection surfaces include:
    a first pair of confronting reflection surfaces which are mutually parallel and included by a predetermined angle with respect to an optical axis of the first light beam emitted from the first light source;
    a second pair of confronting reflection surfaces which are mutually parallel and included by a predetermined angle with respect to an optical axis of the second light beam emitted from the second light source, and
    one of said first pair of confronting reflection surfaces and one of said second pair of confronting reflection surfaces forming intersecting reflection surfaces which intersect at an apex portion of an approximately triangular shape formed by the intersecting reflection surfaces,
    said apex portion having a pair of tapered surfaces having an inclination different from that of the intersecting reflection surfaces.

11. The optical module as claimed in claim 10, wherein the intersecting reflection surfaces reflect center light portions of the first and second light beams in the predetermined direction, and the tapered surfaces reflect peripheral light portions of the first and second light beams in a direction other than the predetermined direction.

12. An optical recording and/or reproducing apparatus for recording information on and/or reproducing information from a recording medium using a light beam, comprising:

an optical pickup which emits one of two light beams having mutually different wavelengths on the recording medium depending on a type of the recording medium; and means for processing the information to be recorded on the recording medium prior to supplying the information to the optical pickup, and processing the information reproduced from the recording medium and obtained from the optical pickup, said optical pickup comprising an integrated optical module comprising:

a first light source which emits a first light beam from a first light emission point in a predetermined location;

a second light source which emits a second light beam from a second light emission point in the same direction as and parallel to the predetermined direction, the second light emission point being arranged at a first distance from the first light emission point; and a plurality of reflection surfaces for reflecting the first and second light beams at least twice, to output the first and second light beams in the same direction as and parallel to the predetermined direction with a second distance between the first and second light beams, the second distance being smaller than the first distance.

13. The optical recording and/or reproducing apparatus as claimed in claim 12, wherein the plurality of reflection surfaces of the optical module include:

a first pair of confronting reflection surfaces which are mutually parallel and are non-perpendicular and non-parallel with respect to an optical axis of the first light beam emitted from the first light source; and a second pair of confronting reflection surfaces which are mutually parallel and non-perpendicular and non-parallel with respect to an optical axis of the second light beam emitted from the second light source.

14. The optical recording and/or reproducing apparatus as claimed in claim 13, wherein:

the first pair of confronting reflection surfaces is made up of a reflection surface which first reflects the first light beam from the first light source in a direction closer to the second light source, and a reflection surface which then reflects the first light beam in a direction away from the first light source; and the second pair of confronting reflection surfaces is made up of a reflection surface which first reflects the second light beam from the second light source in a direction closer to the first light source, and a reflection surface which then reflects the second light beam in a direction away from the second light source.

15. The optical recording and/or reproducing apparatus as claimed in claim 12, wherein:

the plurality of reflection surfaces include a first pair of confronting reflection surfaces which are provided with respect to the first light beam, and a second pair of confronting reflection surfaces which are provided with respect to the second light beam; and an arrangement of the first light source and the first pair of confronting reflection surfaces and an arrangement of the second light source and the second pair of confronting reflection surfaces are symmetrical about an imaginary center line passing between the first and second light sources and extending in the predetermined direction.

\* \* \* \* \*